United States Patent [19]
Hadad et al.

[11] 3,760,420
[45] Sept. 18, 1973

[54] RADIATION SEEKER
[75] Inventors: Joseph D. Hadad, Andover; Troy E. Plunk, Bedford; Donald S. Banks, Wellesley, all of Mass.
[73] Assignee: Raytheon Company, Lexington, Mass.
[22] Filed: Sept. 22, 1969
[21] Appl. No.: 862,636

[52] U.S. Cl............................................. 343/117 R
[51] Int. Cl............................................. G01s 3/42
[58] Field of Search .................... 343/113 R, 117 R

[56] References Cited
UNITED STATES PATENTS
3,144,648  8/1964  Dollinger .................... 343/113 R X
3,175,217  3/1965  Kaiser et al. ................. 343/113 R
2,964,266  12/1960  Fuchs ......................... 343/117 R X Primary Examiner—T. H. Tubbesing
Attorney—Philip J. McFarland and Joseph D. Pannone

[57] ABSTRACT

A system for tracking the direction of a source of electromagnetic radiation. The system utilizes an antenna and a receiver responsive to the radiation at both its carrier frequency and at harmonics of the carrier. Tracking at the harmonic frequency can provide increased angular resolution due to the larger ratio of antenna dimension to harmonic wavelength than is provided by tracking at the carrier frequency. The accuracy is similarly increased because of the increased capability for excluding radiation, such as multipath reflected radiation, arriving from other directions.

10 Claims, 5 Drawing Figures

PATENTED SEP 18 1973　　3,760,420

INVENTORS
JOSEPH D. HADAD
TROY E. PLUNK
DONALD S. BANKS

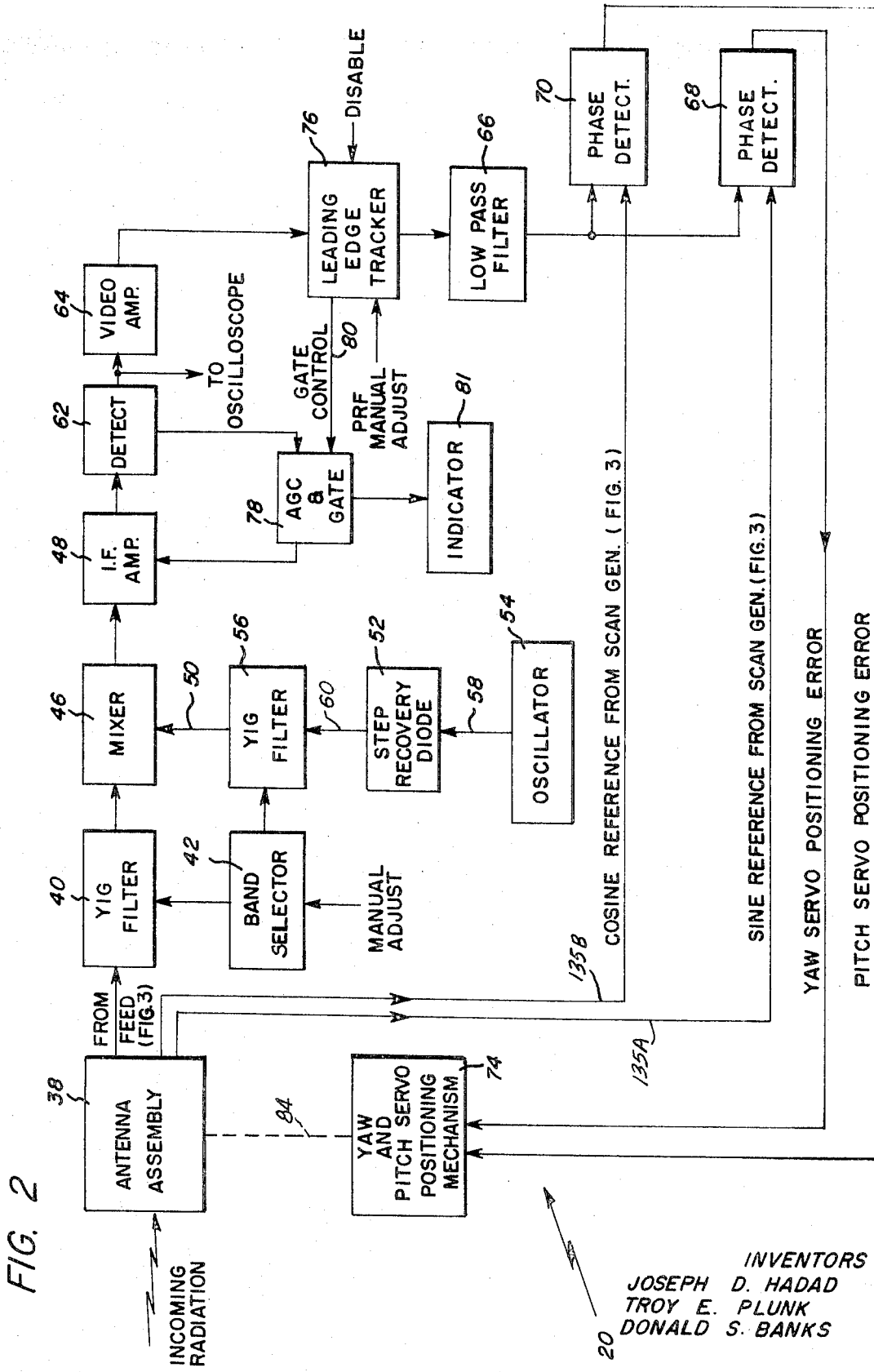

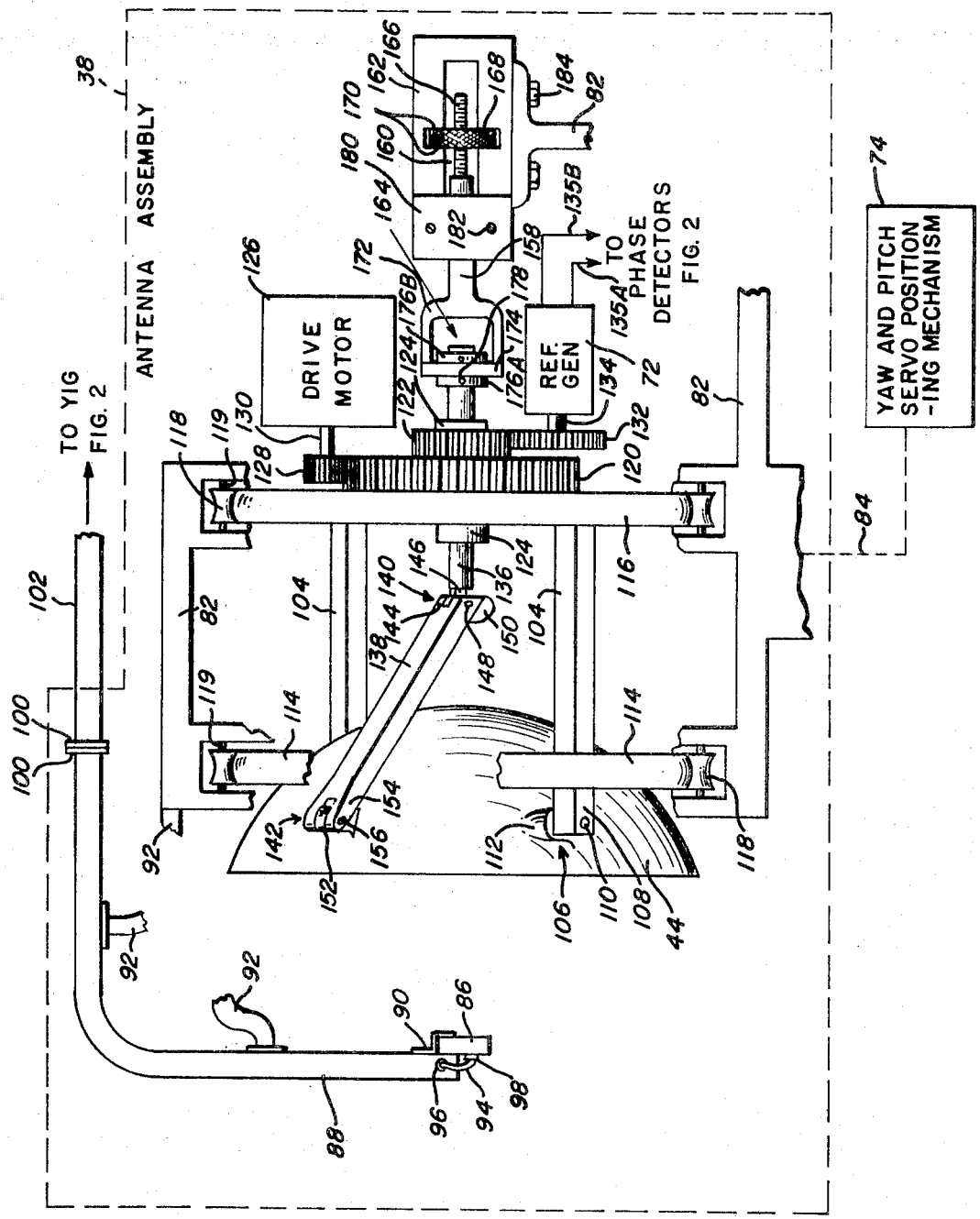

RADIATION SEEKER

BACKGROUND OF THE INVENTION

This invention relates to radiation receiving systems, and more particularly to a receiving system incorporating an antenna and an angle tracking receiver responsive to radiation at its carrier frequency and at a harmonic of the carrier frequency.

An antenna such as a radar antenna is frequently used to determine the direction of arrival of a wavefront of radiation. This application of antennas is exploited to indicate the direction of a target such an an aircraft which serves as a reflector of radar signals or an active source of radiation such as an enemy radar. As is well known, the accuracy with which direction can be measured depends on the available signal to noise power ratio and the shape of the antenna directivity pattern. Of particular interest is the well known dependency of the accuracy on the exclusion of multipath reflected radiation from a receiving system. An appropriately shaped directivity pattern substantially excludes such multipath reflections thereby increasing the accuracy.

The sensitivity of the receiving system to an angular displacement of targets from the antenna axis, that is the angle error slope, is directly related to the shape of the main lobe of the directivity pattern, and more particularly, to the rate of change in received signal strength as a function of angular displacement of the signal source from the antenna axis. The angle error slope and the antenna gain are interrelated in a well known way with the ratio of an antenna dimension, such as the diameter in the case of circular antenna, to the wavelength of the radiation, the larger ratios providing increased gain and greater angle error slope.

Of particular interest is the situation in which a direction finding radar or receiving system is utilized at short range from a source of radiation to determine the direction of this source. Such a situation exists in the final or homing stage of flight of a missile approaching an enemy source of radiation, or a helicopter approaching an electronic beacon. Here the signal strength is sufficiently strong relative to the input noise level that the theoretical limit on the measurement accuracy is in excess of that actually obtainable with the receiving system due to the inherent noise generated within the receiving system. Accordingly, further increases in the measurement accuracy are obtained by a manipulation of the effective gain and boresight error slope of the receiving system.

It is therefore an object of the present invention to provide a receiving system which utilizes the signal provided by a source of radiation in a manner which enlarges the effective antenna gain and angle error slope of the receiving system.

It is a further object of the present invention to provide an improved angle tracking system responsive to radiation over a large band of frequencies.

SUMMARY OF THE INVENTION

A radiation receiving system including a receiver which is tunable over at least an octave of the radio frequency spectrum, and an antenna which is responsive over the same frequency spectrum. The system utilizes angle error sensing means such as well known conical scan or a multiple channel monopulse receiver to provide an off axis target indication. Switching means are provided for alternatively tracking the radiation at its carrier frequency and at a harmonic of the carrier frequency which at short target range presents adequate signal power for accurate measurement of direction, as well as increasing (for example doubling) the ratio of antenna diameter to wavelength for increased resolution and angular accuracy.

BRIEF DESCRIPTION OF THE DRAWINGS

The aforementioned objects and other features of the invention are explained in the following description taken in connection with the accompanying drawings wherein:

FIG. 2 is a diagrammatic representation of the radiation receiving system;

FIG. 3 is a side elevation view of the antenna of the radiation receiving system partially in block diagram form and partially cut away to show a drive mechanism;

DESCRIPTION OF THE PREFERRED EMBODIMENT

Figure 1:
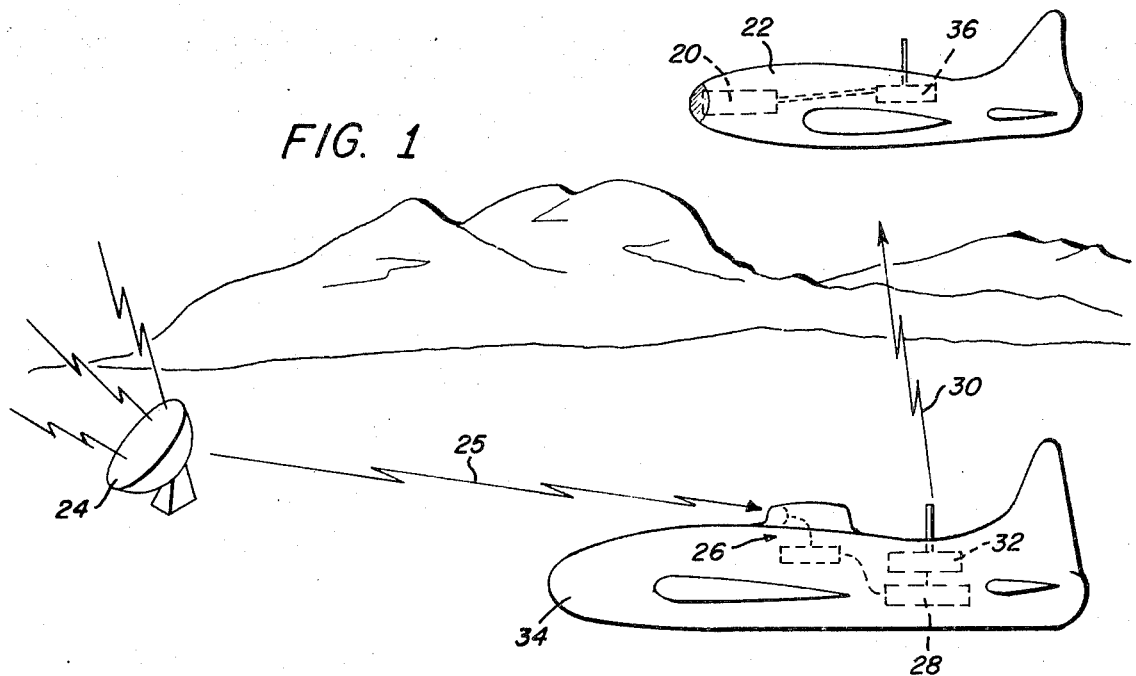
FIG. 1 is a stylized pictorial representation of the radiation receiving system of the invention carried by an aircraft approaching a source of radiation.

Referring now to FIG. 1, there is shown a stylized pictorial representation of the radiation receiving system, hereinafter sometimes referred to as a "seeker" 20, of the invention carried by an aircraft 22 approaching a source of radiation, here shown as an enemy radar 24. In accordance with the invention, the seeker 20 is responsive to the direction of arrival of radiation 25 emanating from the enemy radar 24 at the carrier frequency of the radiation and also at those harmonics of the carrier frequency which fall within the bandwidth of the seeker 20. The tuning of the seeker 20 to the carrier frequency, to be described below with reference to FIG. 2, is accomplished either by having the seeker scan the spectrum of the radiation produced by the radar 24 or, as is shown in FIG. 1, by the use of well known ancillary radar equipment 26 in conjunction with a computer 28 for respectively intercepting radiation emanating from the enemy radar 24 and computing the Doppler frequency shifts induced by the motion of the aircraft 22, to be received by the seeker 20. The frequency and other required information, such as the phase of the radar modulation to be received by the seeker 20 or direction of the source of radiation, are then transmitted to the aircraft 22 via a well known telemetry link 30 utilizing a telemetry transmitter 32 located on board aircraft 34 and a telemetry receier 36 located on board aircraft 22. Additional data, such as the time of arrival of a pulse train which may be transmitted by the enemy radar 24, as well as characteristics of the radiation of enemy radar 24 such as pulse width and pulse repetition frequency, are preferably transmitted via the telemetry link 30 to enable the seeker 20 to discriminate between the radiation of enemy radar 24 and other sources of radiation, not shown, which may be present. In the absence of the ancillary radar equipment 26 the computer 28 and the telemetry transmitter 32, discrimination capability is provided by first operating the seeker 20 in a search and acquisition mode described herein to determine the characteristics of the radiation.

Referring now to FIG. 2, there is shown a block diagram of the seeker 20 having manual controls for tuning to the radiation incoming from a source of radiation such as the enemy radar 24 of FIG. 1. The incoming radiation, including both its carrier and harmonic components, arrives at the antenna assembly 38, to be described in detail with reference to FIG. 3, and then proceeds as a radio frequency (r.f.) signal to an electronically tuned filter, as the YIG filter 40. The operation of a YIG filter including the electronic tuning thereof is described in two patents, namely U.S. Pat. No. 3,435,346 entitled "Electronically Tunable Receiver" which issued to Allen on Mar. 25, 1969, and U.S. Pat. No. 3,435,385 entitled "Electronically Tunable YIG Filter Having An Electronically Variable Bandwidth" which issued to Cohen on Mar. 25, 1969. One well known form of YIG filter comprises a sphere of yttrium iron garnet placed within orthogonally positioned coupling loops, each loop forming a part of a transmission line respectively for the input and output signals. More than one such sphere may be so coupled to each other to provide a desired bandpass characteristic. In a situation such as is described in FIG. 1, the carrier component of the incoming radiation has a frequency, for example, of 2 GHz. The harmonic components which are of substantially reduced power compared to the carrier component have frequencies which are integral multiples of the carrier frequency; thus, in this example the second harmonic component has a frequency of GHz and the third harmonic component has a frequency of GHz. The incoming radiation also has spectral lines due to modulation, such as is normally present with radar signals, which lie in bands, one such band being centered about each of the spectral lines of the carrier and harmonic components. However, these bands of the modulation spectrum are, in this example, very narrow compared to the spectral spacing between the harmonic components and the spectrum may therefore be treated, for the purposes of this analysis, as simply a line spectrum having the lines corresponding to the carrier and harmonic components.

The function of the YIG filter 40 is to select that spectral line of the incoming radiation which is to be processed by the seeker 20. A control current provided by band selector 42 is applied to the YIG filter 40 to tune the pass band of YIG filter 40 to the desired spectral line. The band selector 42 comprises a well known variable source of current permitting the current to be readily adjusted (manually) to a value which tunes the YIG filter to the desired spectral line. The bandpass characteristic of the YIG filter 40 is appropriately shaped so that when the YIG filter 40 is tuned to a selected harmonic component, the carrier component is sufficiently attenuated to permit the seeker 20 to respond to that harmonic component with essentially no interference from the carrier component.

Thus, the seeker 20, in accordance with the invention, is responsive to the angle of arrival relative to the antenna assembly 38, of a wavefront of radiation having at least a portion of its spectrum within the pass band of the YIG filter 40. In its most basic form, the radiation receiving system of the invention comprises an antenna responsive to radiation over at least one octave of the electromagnetic spectrum to permit reception of a carrier and at least the first harmonic component of the radiation, filtering means to select a portion of the spectrum of the radiation incident upon the antenna, and some form of well known angle tracking means, such as three channel monopulse, four channel phase comparision, or single channel conical scan, the latter being implemented in the embodiment of the seeker 20 as shown in FIGS. 2 and 3. In particular, the single channel conical scan system and antenna as depicted in FIGS. 2 and 3 is a modification of that described in "Introduction to Radar Systems" (hereinafter referred to as "Skolnik") by Merrill I. Skolnik, McGraw Hill Book Company, 1962, pages 166-179, and particularly FIG. 5.3. The operation of the seeker 20 differs from the system taught by Skolnik having the additional filtering capability, mentioned above, for selecting a portion of the spectrum of the incoming radiation, and means presently to be described, for changing the motion of the conical scan antenna to vary the squint angle as will be described with reference to FIG. 3. Accordingly, the radiation receiving system of the invention operates to track the angle of arrival of a wavefront incident upon the antenna, in response to a selected portion of the spectrum of the incident radiation.

The improved angle accuracy and resolution provided by the invention becomes apparent from consideration of the factors fundamental to the measurement of the angle of arrival of an incident wavefront. This is of particular importance in military situations in which the wavefront may emanate from a target such as a missile. As taught in Skolnik, particularly Section 10.7, and in "Probability and Information Theory with Applications to Radar" (hereinafter referred to as "Woodward") by Philip M. Woodward, McGraw Hill Book Company, 1953, Chapter 6, the accuracy with which a coordinate of a target such as the direction of the target relative to a radar antenna can be measured, as well as the resolution — the ability to distinguish between two closely spaced targets — depend on the ratio of the available signal power to the noise power within the bandwidth of the measuring apparatus, herein the seeker 20, and the ratio of an antenna dimension, particularly a diagonal, of the radiating aperture to the wavelength of the radiation incident upon the receiving aperture. The diagonal of the radiating aperture is a particularly useful dimension for radiating apertures of various shapes, and, in the case of a circular aperture such as that provided by the dish 44 of FIG. 3, the diagonal becomes the diameter.

The greater portion of the power radiated by a source of radiation, such as a target or the enemy radar 24 of FIG. 1, is radiated typically at the carrier frequency or within a narrow spectral band centered at the carrier frequency. Relatively little power is radiated at harmonics of the carrier frequency. Accordingly, angle tracking systems of the prior art have been designed to respond to radiation within a relatively narrow band about the carrier frequency. The accuracy of the measruement made by these systems increases with decreasing distance to the target due to the increasing signal strength relative to any background noise and receiver front end noise. However, a point is reached where further decreases in target distance provide little improvement in the measurement accuracy due to limitations of the instrumentation error of the system, as is readily shown by considering the effect of self noise, that is noise, other than the thermal noise of the r.f. and i.f. portions of a receiving system, which is inherent in the components of the system. For example, as is well known, a phase detector typically utilizes a diode bridge circuit. Nonlinearities resulting from noise produced inherently by the diodes cause minute distortions in the symmetry of the reference signal waveforms which appear as an apparent shift, in time, of the reference signal and produce a corresponding phase error. The seeker 20 utilizes phase detectors, to be described, in measuring the direction of a source of radiation and, because of self-noise, a small error, approximately 1 milliradian, results even with a noise-free input signal. The effect of the self-noise is independent of the frequency of the radiation incident upon the antenna. Accordingly, at the high power levels present at a relatively short range from the source of radiation, the best accuracy obtainable with a harmonic is not reduced from that obtainable with the carrier.

Further increases in the measurement accuracy can be obtained by utilizing the harmonic components of the radiation when the received carrier power is of reduced intensity such as in the situation where the seeker approaches the target, or source of radiation, at a direction corresponding to a null in the target directivity pattern. At a relatively short distance to the target the harmonic components which, in the aforesaid situation may be comparable to the power at the carrier, frequently provide sufficient power for accurate measurement. At the first harmonic of the carrier frequency, the ratio of the diameter of dish 44 to harmonic wavelength is double the ratio of the diameter of dish 44 to the carrier wavelength, and at the second harmonic this ratio is tripled resulting in improved antenna gain and increased sensitivity to antenna pointing errors which substantially increases the accuracy of the measurement and, as has been mentioned, in the case of multipath reflections of radiation the increased gain of the seeker antenna at the harmonic frequencies reduces the effect of the multipath reflections to further improve the accuracy.

Referring again to the block diagram of FIG. 2, the radio frequency (r.f.) signal passed by the YIG filter 40 is translated to an intermediate frequency signal (i.f.) with the aid of mixer 46, the mixer serving to combine with the r.f. signal a reference signal indicated by line 50 having an appropriate frequency to produce the i.f., and amplified in the amplifier 48, having a bandpass filter characteristic which rejects mixer output frequencies other than the desired i.f. The reference signal 50 is provided by means of a well known circuit such as the circuit comprising step recovery diode 52, oscillator 54 and YIG filter 56. Step recovery diode 52 is excited by a signal 58 of a predetermined frequency provided by oscillator 54, and in response thereto provides an output signal indicated by line 60 which, as is well known, has a comb spectrum having spectral lines which are integral multiples of the frequency of oscillator 54. For example, in response to a signal at a frequency of 200 MHz from oscillator 54, the step recovery diode 52 produces signals at 1,800 MHz, 2,000 MHz, 2,200 MHz, as well as higher values such as 4GHz and 6 GHz. YIG filter 56 has a pass band, for example, of 60 MHz bandwidth at its 3db points. It is also desirable that the frequency of oscillator 54 be adjustable over a relatively small range, approximately 10 MHz, to permit a more precise selection of the frequency of the reference signal 50, particularly when the r.f. spectral lines fall midway between two successive lines of the comb spectrum. Thus, the seeker 20 is tuned to the desired spectral line of the incoming radiation by manually adjusting the band selector 42 so that this spectral line is translated down to i.f. to fall within the pass band of amplifier 48.

The amplitude of the i.f. signal is amplified by amplifier 48 and detected by detector 62, further amplified by video amplifier 64, and filtered by filter 66, to attenuate those components of the detected amplitude having frequency spectra above the conical scan frequency. Thus, for example, in the frequently occurring situation wherein the incoming radiation is amplitude modulated with pulses having a frequency spectrum above the conical scan frequency, the output of filter 66 is essentially free of this pulse modulation and exhibits an amplitude which varies cyclically in accordance with the direction of arrival of the incoming radiation relative to the instantaneous beam axis of the conically scanning antenna.

The output of filter 66 is then combined with sine and cosine reference signals in phase detectors 68 and 70, the sine and cosine reference signals being provided by reference generator 72 of FIG. 3. As is well known, the values of the sine and cosine reference signals precisely correspond to the position of the rotor (not shown) of the reference generator 72 which in turn is precisely aligned with the position of the dish 44 by means of the gear train, described below. The outputs of phase detectors 68 and 70 are the yaw and pitch servo error signals which are applied to the yaw and pitch servos 74, shown in FIGS. 2 and 3, to position the antenna assembly 38 relative to the other components of the seeker 20 which are stationary. Yaw and pitch indicators, not shown, on yaw and pitch servos 74 may be used to show the direction of arrival of the incoming radiation.

The seeker 20 also has a well known leading edge tracker 76 to aid in discriminating between two targets or sources of radiation by tracking the modulation of the signal from a selected target, as in the case of two enemy radars providing pulsed radiation at different pulse repetition frequencies (hereinafter PRF). The leading edge tracker 76, described in "Handbook of Radar Measurements" by D. K. Barton and H. R. Ward, Prentice Hall, 1969, pages 78–81, is manually adjusted to respond to the PRF of the desired target, and locks onto the leading edges of the pulses transmitted by the target. The leading edge tracker 76 acts as a gate excluding all signals except such signals as may arrive during the interval when a pulse from the desired target is anticipated. In this way the seeker 20 is substantially capable of discriminating between targets transmitting with different PRF's.

Automatic gain control (hereinafter AGC) and gating circuitry 78 is provided to vary the gain of amplifier 48 in response to the strength of the i.f. signal so that strong signals do not overdrive (or saturate) the amplifier 48. The AGC circuit responds to a sample of the i.f. signal amplitude provided by the detector 62. The gating circuitry in response to the gate control signal 80 of the leading edge tracker 76 gates OFF amplifier 48 thereby excluding all i.f. signals except such signals as may arrive during an interval when a pulse from the desired target is anticipated, this interval being larger than and enclosing the gate width of the leading edge tracker, 76, thus insuring that the leading edge tracker 76 has ample time to respond to the desired i.f. signal pulse. The effect of this gating circuitry in excluding the aforesaid i.f. signals from the amplifier 48 is to ensure that these excluded i.f. signals do not overdrive the amplifier, and furthermore that the AGC circuitry is rendered insensitive to these excluded i.f. signals and responsive only to the desired i.f. signal pulses. There is also provided an indicator 81 which may be a volt meter or a panel of lights which is responsive to the AGC signal applied to amplifier 48 and indicated the amplitude of the desired i.f. signal pulses, thereby informing an operator of the seeker 20 to operate the band selector 42 to tune the seeker 20 to one of the harmonics.

Referring now to FIG. 3, there is a detailed side elevation view, partially cut away, to show the construction of the antenna assembly 38. The antenna assembly 38 is supported on a rigid movable frame 82 mechanically connected, as indicated by line 84, to the yaw and pitch servos 74, shown in block diagram form. The dish 44 is positioned, in a manner to be described, to reflect and focus the incoming radiation towards feed 86 (preferably of strip line construction to be described with reference to FIGS. 4 and 5), which is held stationary relative to the frame 82. The feed 86 is mounted at an end of a rigid waveguide 88 by means of clamp 90, the rigid waveguide 88 being fixedly held relative to the frame 82 by means of supporting struts 92, partially shown in FIG. 3. The feed 86 is electrically connected to the rigid waveguide 88 by means of a coaxial cable 94 suitably terminated at the rigid waveguide 88 as by a probe (not shown), the external collar thereof being indicated by numeral 96 in FIG. 3, and by a coax to stripline transition 98 at the feed 86. The rigid waveguide 88 is connected at waveguide flanges 100 to a flexible waveguide 102 by which r.f. signals are conducted to the YIG filter 40, shown in FIG. 2, the flexible waveguide 102 permitting movement of the rigid waveguide 88 relative the stationary portion of the seeker 20.

The dish 44 has a diameter of typically 12 inches for receiving incoming radiation having spectral lines within the spectral region of 2 GHz to 10 GHz. The dish 44 is pivotally supported by two pivots located diametrically opposite each other at extensions of two struts 104, one such pivot and strut extension being shown and indicated respectively by numerals 106 and 108. Each pivot comprises a pin 110 inserted through a strut extension 108 into a boss 112 located on the outer surface of the dish 44, thereby permitting pivoting of dish 44 relative to strut 104 about pin 110. The two struts 104 rigidly interconnect two coaxial wheels 114 and 116 which are supported within frame 82 by means of rollers 118 each of which rotates about an axle 119 connecting with frame 82. Wheel 114 has an annular form permitting dish 44 to be nested therein thereby providing a compact form for antenna assembly 38 and reducing the lengths of strut extensions 108 for increased rigidity. The structure formed by wheels 114 and 116 and struts 104 is rotatable relative to frame 82 and provides for rotation of dish 44 about the common axis of wheels 114 and 116 while simultaneously permitting the aforesaid pivoting of dish 44. The dish 44 is rotated, by means to be described, at the conical scan frequency and pivoted, by means to be described, in accordance with the desired squint angle.

Two gears 120 and 122 are mounted on sleeve 124 coaxial with and rigidly connected to wheel 116. Motor 126 rigidly connected to frame 82 by a bracket, not shown in FIG. 3, drives gear 120 through pinion 128, located on shaft 130, to impart rotation to wheel 116, gear 122 and dish 44 at the conical scan frequency. Reference generator 72, rigidly connected to frame 82 by a bracket, not shown, is driven by gear 122 through gear 132 (having a 1:1 gear ratio with gear 122) mounted on shaft 134, to provide an indication of the angle of rotation of dish 44 through the sine and cosine reference signals, mentioned above with reference to FIG. 2, which are conducted by electrical conductors 135A and 135B to the phase detectors 68 and 70 of FIG. 2.

The dish 44 is pivoted by means of a shaft 136 which is slidably mounted within and coaxial to sleeve 124 and a push rod 138 which is pivotally connected at one end thereof to the shaft 136 by pivot 140, and at the other end thereof to the outside of dish 44 by pivot 142. Pivot 140 comprises an end fitting 144 on push rod 138 and an end fitting 146 on shaft 136 which are threaded by a pin 148. End fitting 144 also includes a counterweight 150 to balance the centrifugal force applied to pin 148 by push rod 138 during rotation of dish 44 about the axis of shaft 136. Pivot 142 comprises a fitting 152 which extends outwardly from dish 44 and an end fitting 154 on push rod 138 which are threaded by a pin 156. A counterweight, not shown in FIG. 3, is located on the dish 44 diametrically opposite pivot 142 and coplanar with pivot 142 and the two pivots 106 to balance the centrifugal force applied by pivot 142 and push rod 138 to dish 44 during its rotation about the axis of shaft 136.

Shaft 136 is slid axially along sleeve 124 for pivoting dish 44 to provide the desired squint angle. Shaft 136 is positioned by means of shaft 158 slideably positioned within a channel 160 in housing 162 and coupled to shaft 136 by a coupling 164. Shaft 158 has a rectangular cross section, as does channel 160, which constrains the shaft 158 to slide axially without rotation. Shaft 158 terminates in a threaded portion 166 about which is rotatably positioned a knurled wheel 168 internally threaded so that rotation of the knurled wheel 168 draws it against one of the two shoulders 170 of housing 162 and causes a corresponding shift in the position of the shaft 158. Coupling 164 comprises an end fitting 172 on shaft 158, the end fitting 172 terminating at an annular member 174 slideably positioned on shaft 136 between two rings 176A and 176B fixedly secured to shaft 136 by set screws 178. The two rings 176A and 176B permit rotation of shaft 136 relative to shaft 158 while urging shaft 136 in translational movement to a predetermined position as set by shaft 158. Thus, the squint angle is manually adjustable independently of the rotation of dish 44 about the axis of the shaft 136, the adjustment being here effected by a rotation (manually) of the knurled wheel 168.

The housing 162 has a plate 180 which is fastened to the housing 162 by screws 182 to guide the shaft 158 within the channel 160, and to simplify insertion of the shaft 158 into the housing 162 during construction of this embodiment of the invention. The housing 162 is conveneintly mounted on a member of frame 82 by means of bolts 184 which further facilitates construction of this embodiment of the invention.

Figure 4:
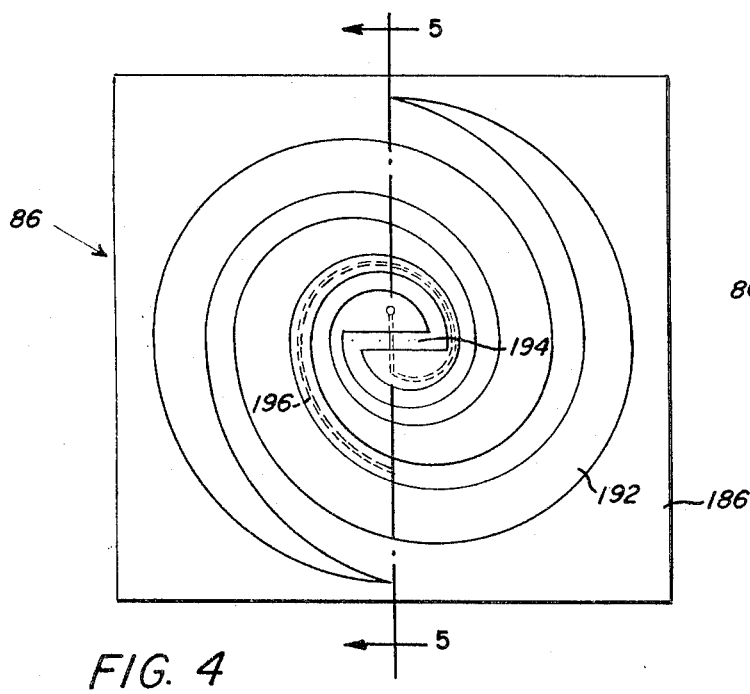
FIG. 4 is a front view of the radiating surface of the feed of the antenna of FIG. 3.
Figure 5:
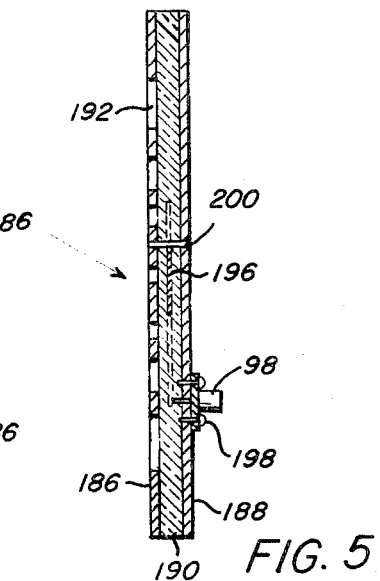
FIG. 5 is a sectional view of the feed of FIG. 4 taken along the lines 5-5.

Referring now to FIG. 4 and FIG. 5, there are shown, respectively, front and sectional views of the feed 86. Feed 86 is a stripline radiator having a laminated construction comprising two parallel electrically conductive plates 186 and 188, typically of copper foil, separated by a layer of dielectric material 190 such as polyphenylene oxide or the well known Teflon-fiberglass (Teflon being a trademark) composition. The radiating aperture of feed 86 is formed by etching in plate 186 a double interleaved spiral slot 192 of varying cross section substantially as shown in FIG. 4, the two branches of the spiral slot 192 being joined at the center by a linear slot segment 194 of uniform cross section. This form of radiator is responsive to electromagnetic radiation within a frequency spectrum substantially greater than an octave, the physical size of the radiating aperture being related to the frequency spectrum within which this form of radiator is responsive. Thus, the feed 86, as shown in FIG. 4, having a square perimeter of one inch on a side is responsive to radiation within the frequency spectrum of 2 GHz to 10 GHz with a gain on the axis of approximately 3 db compared to an isotropic radiator.

Electromagnetic energy incident upon the radiating aperture of feed 86 is coupled from the spiral slot 192 at the linear slot segment 194 to a conducting strip 196, substantially as shown in FIGS. 4 and 5, preferably of copper foil, and imbedded in the dielectric material 190 equidistant between the two plates 186 and 188. The conducting strip 196 is also of a generally spiral form and is positioned beneath the metallic strip of the plate 186 which separates one arm of the spiral slot 192 from an adjacent arm, thereby supporting a TEM (transverse electromagnetic) wave. The conducting strip 196 terminates at one end thereof at the coax-to-stripline transition 98, which is attached by screws 198 to feed 86 and at the other end thereof passes beneath the linear slot segment 194 to terminate at a pin 200 which passes through the feed 86 from plate 186 to plate 188.

The feed 86 is conveniently fabricated from two laminated boards, each comprising copper foil plates separated by dielectric material, herein referred to as upper and lower boards. One plate of the upper board, plate 186, is etched to produce spiral slot 192; the other plate is etched away completely. One plate of the lower board serves as plate 188 while the other plate is etched to form the conducting strip 196. The upper and lower boards are then placed together to form feed 86, the feed being completed by drilling a hole for insertion of pin 200, and connecting the coax-to-transition 98 with the screws 198.

In operation therefore the seeker 20 is carried by a vehicle, for example an aircraft, in the vicinity of a source of radiation. The operator adjusts the band selector 42 to tune the YIG filters 40 and 56 over the frequency spectrum which the radiation may occupy. If the spectrum to be examined is larger than the tuning range of a single YIG filter, two yig filters, not shown in the drawings, may be operated in parallel connection with switching circuitry such that one such filter is utilized over the lower portion of the spectrum and the other utilized over the upper portion of the spectrum. When the frequency of radiation is unknown, the operator varies the tuning to search through the spectrum until he acquires the desired signal. During this search and acquistion the leading edge tracker 76 is disabled so that the gate control signal 80 permits the AGC portion of the AGC and gating circuitry 78 to function continuously with whatever i.f. signal is present. An oscilloscope, not shown, is connected to the output of detector 62 for monitoring the r.f and i.f. signals to determine their PRF. When an r.f. signal having the anticipated spectral line and PRF is observed, the leading edge tracker 76 is enabled and locks on to the desired signal. The phase detectors 68 and 70 respond to these signals and in conjunction with the yaw and pitch servos 74 drive the antenna assembly 38 to point towards the source of radiation producing the aforesaid r.f. signal. When indicator 81 indicates sufficient signal strength, the band selector 42 is switched to tune the YIG filters 40 and 56 to the next higher harmonic spectral line of the r.f. signal. In response thereto the antenna assembly 38 is directed with increased precision to point towards the source of radiation. The direction of the source is indicated by yaw and pitch indicators, not shown in the figures, located on the yaw and pitch servos 74.

An example of the increased accuracy attained by this invention in determining the direction of a typical source of radiation is now presented. A radar, such as the enemy radar 24 of FIG. 1, transmits a peak power $P_t = 2$ MW through a side lobe (of the radar antenna directivity pattern) towards the seeker 20, the side lobe having a gain $G_t = 5$ db. The signal to noise power ratio $S/N$ at the seeker 20 is given by $$S/N = [P_t G_t G_R \lambda^2]/[(4\pi R)^2 KTB \overline{NF}] \quad (1)$$

where $G_R$ is the receiver gain, that is, the antenna gain of the seeker 20 and for the purpses of the example is presumed to have a value of $G_R = 25$ db at X-band (19 db at S-band). The power received by the seeker antenna depends on the area of the antenna aperture and is independent of frequency (as is readily apparent since $G_R$ is frequency dependent and $(G_R \lambda^2)$ is independent of frequency) so that $\lambda$, the wavelength of the transmitted radiation, is conveniently given a value $\lambda = 0.1$ foot corresponding to an X-band frequency of approximately 10 GHz. The source to seeker range is $R = 300$ K ft, approximately 50 nautical miles. $KT$, the product of Boltzman's constant and the receiver temperature is given (in decibels, for computational convenience) as $KT=(-204$ db$)$. The seeker receiver bandwidth $B$ is typically $B = 1$ MH$_z$. and the noise figure $\overline{NF} = 10$ db. Substituting in the above equation gives $S/N = 75$ db. Similarly at an S-band frequency of 2.5 GHz. $S/N = 75$ db assuming again that $P = 2$MW and $G_t = 5$ db.

The angle error $\sigma$ in the measurement of the direction of the source from the seeker is given by $$\sigma_\theta 7 = \theta_B / \sqrt{S/N} \quad (2)$$

where $\theta_B$ is the beamwidth (3 db) of the seeker antenna. A 12 inch diameter dish (the dish 44 of FIG. 3) designed to operate at an S-band carrier frequency of 2.5 GHz provides a beamwidth $\theta_B = 28°$, and a similar 12 inch diameter dish designed to operate at an X-band carrier frequency of 10 GHz provides a beamwidth $\theta_B = 7°$. Side lobes at the higher frequencies are sufficiently suppressed, being reduced in intensity by at least 10 db below the main lobe to permit a transition from an S-band measurement to an X-band measurement. In practice the dish is designed for midband frequency, approximately 5 GHz, in which case the values of $\theta_B$ differ slightly from the aforesaid 28° and 7°, the difference being essentially insignificant for the purpose of this analysis. The angle error $\sigma$ at S-band is, therefore, upon substitution in equation 2, $\sigma_\theta \approx 0.1$ milliradians, a significantly smaller value than the instrumentation error of the seeker which has a value, typically of 1 mr. Thus in this example the major source of measurement error is due to the inherent characteristics of the seeker, the signal to noise ratio of 75 db being sufficiently high to remove the receiver front end noise ($KTB \overline{NF}$) as a significant contribution to the measurement error.

It is, therefore, apparent that a further increase in signal power $S$, as would be obtained by reducing the range $R$ to 5 NM, would produce a negligibly small improvement in the measurement accuracy. It is now shown that such an improvement can be effected by tuning the seeker to a hormonic of the carrier frequency.

The power transmitted by the typical source of radiation, particularly radar antennas, at harmonics of the carrier frequency is related to that at the carrier frequency by the following generally applicable empirical formulation $$P_h = \log \hat{P} - 43 \text{ db} - H3 \text{ db}$$

(3)

where $P_h$ is the power (in db) transmitted at the harmonic, $\hat{P}$ is the total power transmitted which closely approximates the power trans-mitted at the carrier, and $H$ is an integer equal to the number of the harmonic, that is, second, third or fourth harmonic of the carrier.

Referring now to the fourth harmonic, 10 GHz, of the carrier, 2.5 GHz, equation 3 shows that the transmitted power is reduced by 55 db and accordingly the previously calculated value for the signal to noise power ratio $(S/N)_1 = 75$ db is reduced to $(S/N)_4 = 20$ db where the subscripts 1 and 4 have been introduced to indicate expressions relating to respectively the carrier and the fourth harmonic. Utilizing equation 2 and the value $(\theta_B)_4 = 7°$, the value of the angle error at the fourth harmonic is $$(\sigma_\theta) \approx 11 \text{ mr}$$

at the range $R = 50$ NM. This value of the angle error is eleven times greater than the instrumentation error, while the error obtained by utilizing the carrier was much less than the instrumentation error. Thus, at 50 NM utilization of the fourth harmonic substantially reduces the measurement accuracy; however, the beamwidth $(\theta_B)_4 = 7°$ increases the angular resolution capability of the seeker antenna by a factor of four over that obtained by utilizing the carrier since $(\theta_B)_1 = 28°$.

When the seeker approaches the source to within 5 NM from the aforesaid range of 50 NM, equation 1 indicates a one hundredfold increase in the signal to noise ratio which, as is shown by equation 2, results in a tenfold decrease in the angle error. Thus, at 5 NM, $(\sigma_\theta)_4 = 1.1$ mr approximately equal to the instrumentation error. Hence, at a range of 5 NM and with utilization of the fourth harmonic, the accuracy of the seeker approximates the best accuracy obtainable by use of the carrier; and furthermore, the resolution capability is increased by a factor of four.

The responsivity of the seeker to radiation within the spectral region of S-band to X-band provides still further advantages. One such advantage arises because of the different directivity patterns provided at different frequencies by a source of radiation. A lobe in the harmonic directivity pattern can occur at the position of a null in the carrier directivity pattern so that, with reference to the preceding example, a seeker approaching a source of radiation in the direction of such a null may receive signal power at the harmonic comparable to that of the carrier, thereby providing the seeker a capability for homing in on a source of radiation from directions other than those in which a lobe is present in the carrier directivity pattern.

A similar advantage is found in those situations wherein the radiation from the source reflects off a nearby object such as a building or a hill. The reflected radiation at a harmonic may emanate from a portion of the source corresponding to a null in the carrier directivity pattern, and accordingly may be stronger than radiation at the carrier, directly transmitted (without reflection) via a side lobe toward the seeker. Here, by using the harmonic component of the radiation, the seeker can track the source rather than to track the nearby object as would be the case if the carrier component were utilized.

In those situations where the carrier frequency is below the spectral region to which the seeker is responsive, the seeker can still track the direction of a source of radiation (at relatively short ranges) by tracking at a harmonic.

With reference to nomenclature it is convenient to define an antenna axis to serve as a reference for measuring direction to a source of radiation, or target, the definition being compatible with seekers employing a fixed antenna such as a Cassegrain antenna or a corporate feed stripline antenna in combination with a three channel amplitude comparison monopulse receiver or four channel comparison monopulse receiver, as well as being compatible with the conically scanning antenna disclosed herein. Accordingly, in the case of the conically scanning antenna, the antenna axis is taken as the axis of rotation of the dish or the feed, in FIG. 3 — the common axis of wheels 114 and 116 — this corresponding with the average position of the main lobe of the directivity pattern in the embodiment of FIG. 3. With fixed antennas the antenna axis is taken as the normal to the antenna aperture at the center of the aperture, this corresponding to the average position of the main lobe of the directivity pattern with most antennas.

It is understood that the above-described embodiment of the invention is illustrative only, and that modifications thereof will occur to those skilled in the art. For example, the manual tuning and acquisition procedure disclosed herein can be automated by suitable well known data processing and control equipment. Accordingly, it is desired that the invention is not to be limited to the embodiments disclosed herein but is to be limited only as defined by the appended claims.

What is claimed is:

1. Apparatus for determining the direction of a radiant source which radiates energy at a first and a second frequency having a ratio of at least 2:1, the apparatus comprising:
   a. antenna means responsive to radiant energy from the radiant source at the first and the second frequencies, and providing an output indicative of the direction of the radiant source relative to the antenna axis;

b. receiving means responsive to the antenna output for providing selectively first and second signals indicative of the direction of the radiant source relative to the antenna axis, the first signal being related to the ratio of a diagonal of the antenna radiating aperture to the wavelength of the radiation at the first frequency, and the second signal being related to the ratio of the diagonal of the antenna radiating aperture to the wavelength of the radiation of the second frequency.

2. The apparatus of claim 1 wherein the receiving means includes tuning means for tuning the receiving means selectively to radiant energy at the first and the second frequencies whereby the receiving means is selectively responsive to the radiant energy at the first and the second frequencies.

3. The apparatus of claim 2 including positioning means responsive to the first and the second signals for directing the antenna means towards the radiant source.

4. A radiation processing system responsive to signals radiated from at least one source of radiation, the system comprising in combination:
  a. seeker means selectively responsive to the carrier frequency and to harmonics of the carrier frequency of radiated signals having differing spectral frequency characteristics and selectively responsive to the modulation of radiated signals having differing modulation characteristics for indicating the direction of one source of radiation;
  b. vehicular means for transporting the seeker means towards said one source of radiation;
  c. sensing means for receiving the radiated signals and determining their frequency and modulation characteristics; and
  d. telemetry means, connecting with the sensing means for transmitting to the seeker means the frequency and modulation characteristics of the radiated signals, there facilitating acquisition of the radiation signals by the seeker means.

5. The system of claim 4 wherein the seeker means comprises:
  a. antenna means responsive to radiant energy at its carrier frequency and at harmonics of the carrier frequency to provide an output indicative of the direction of a source of radiation relative to the antenna axis; and
  b. receiving means responsive to the antenna output for providing first and second signals indicative of the direction of the source of radiation relative to the antenna axis, the first signal being a function of the ratio of a diagonal of the antenna radiating aperture to the carrier wavelength, and the second signal being a function of the ratio of the diagonal of the antenna radiating aperture to the wavelength of a harmonic of the carrier.

6. system of claim 5 wherein the receiving means, within the seeker means, includes tuning means for tuning the receiving means selectively to the carrier and the harmonic frequencies whereby the receiving means is selectively responsive to radiant energy at the carrier and the harmonic frequencies.

7. The system of claim 6 wherein the receiving means further includes modulation selection means adapted to track the modulation of a selected source of radiation and exclude signals from other sources of radiation having modulation characteristics significantly different from the modulation characteristics of the signal from the selected source of radiation.

8. The system of claim 7 wherein the sensing means includes computing means connecting with the telemetry means for calculating the Doppler modulation imposed on radiated signals propagating between a source of radiation and the seeker means, thereby permitting the calculated Doppler modulation to be transmitted to the seeker means via the telemetry means.

9. Apparatus for determining the direction, relative to an antenna axis, of a radiant source of energy which radiates energy at a fundamental frequency and at least one harmonic thereof, such apparatus comprising:
  a. a directional antenna adapted to receive energy at a fundamental frequency and harmonic thereof;
  b. means for repetitively scanning the directional antenna about a rotation axis to modulate periodically the intensity of the energy received thereby; and
  c. receiving means responsive to a selected portion of the energy from the directional antenna, for producing an output signal indicative of the direction of the source of energy relative to the rotation axis, such receiving means being adapted to selectively respond to the modulated intensity of the energy at the fundamental and the harmonic frequencies.

10. In combination:
means responsive to energy incident thereupon at a first frequency and at a second frequency for providing data of a direction of incidence of such energy; and
means coupled to said direction data means and responsive to said data for providing selectively first and second signals indicative of said direction of incidence, said first signal being related to the responsivity of said direction data means to energy at said first frequency, and said second signal being related to the responsivity of said direction data means to energy at said second frequency.

* * * * *

UNITED STATES PATENT OFFICE
CERTIFICATE OF CORRECTION

Patent No. 3,760,420         Dated September 18, 1973

Inventor(s) Joseph D. Hadad, Troy E. Plunk and Donald S. Banks

It is certified that error appears in the above-identified patent and that said Letters Patent are hereby corrected as shown below:

In the Specification

Column 1, line 12, after "such" change "an an" to "as an".

Column 2, line 55, change "receier" to "receiver".

Column 3, line 31, after "of" add -- 4 --.

Column 3, line 33, before "GHz." add -- 6 --.

Column 7, line 8, change "indicated" to "indicates".

Column 8, line 26, change "is-" to "is".

Column 9, line 55, change "yig" to "YIG".

Column 10, line 50, after "error" change "$\sigma$" to "$\sigma_\theta$".

Column 10, line 53, Equation (2), after "$\sigma_\theta$" delete "7".

Column 11, line 3, after "error" change "$\sigma$" to "$\sigma_\theta$".

Column 11, line 18, change "hormonic" to "harmonic".

In the Claims

Claim 1b, column 13, line 10, change "of" to "at".

Claim 4d, column 13, line 39, change "there" to "thereby".

Claim 6, column 14, line 3, after "6." add -- The --.

Signed and sealed this 8th day of April 1975.

(SEAL)
Attest:

RUTH C. MASON
Attesting Officer

C. MARSHALL DANN
Commissioner of Patents
and Trademarks